United States Patent
Chen

(10) Patent No.: US 6,847,414 B2
(45) Date of Patent: Jan. 25, 2005

(54) MANUFACTURING METHOD FOR LIQUID CRYSTAL DISPLAY

(75) Inventor: Hsin-Ming Chen, Hsinchu (TW)

(73) Assignee: Toppoly Optoelectronics Corp., Chu-Nan (TW)

(*) Notice: Subject to any disclaimer, the term of this patent is extended or adjusted under 35 U.S.C. 154(b) by 105 days.

(21) Appl. No.: 10/421,776

(22) Filed: Apr. 24, 2003

(65) Prior Publication Data

US 2004/0041955 A1 Mar. 4, 2004

(30) Foreign Application Priority Data

Sep. 3, 2002 (TW) ..................... 91120094 A

(51) Int. Cl.[7] .............................................. G02F 1/133
(52) U.S. Cl. ...................................................... 349/47
(58) Field of Search ............................................ 349/47

(56) References Cited

U.S. PATENT DOCUMENTS

| | | | | |
|---|---|---|---|---|
| 5,251,049 A | * | 10/1993 | Sato et al. ............... | 349/43 |
| 5,942,374 A | * | 8/1999 | Smayling ................ | 430/312 |
| 6,034,749 A | * | 3/2000 | Sato et al. ............... | 349/47 |
| 6,057,557 A | * | 5/2000 | Ichikawa ................. | 257/59 |
| 6,617,623 B2 | * | 9/2003 | Rhodes .................... | 257/215 |

\* cited by examiner

*Primary Examiner*—James A. Dudek
(74) *Attorney, Agent, or Firm*—Troxell Law Office PLLC

(57) ABSTRACT

A method for manufacturing a liquid crystal display including a pixel portion having a pixel TFT as well as a drive circuit portion having a N-type TFT and a P-type TFT is disclosed. Firstly, an un-doped silicon layer, an N-type silicon layer and a metal layer are sequentially formed over a substrate; then, the metal layer and the N-type silicon layer are patterned to define source and drain electrodes for the N-type TFT, source and drain electrodes for the pixel TFT and a bottom electrode of a storage capacitor; thereafter, a gate oxide layer and a gate metal layer are sequentially formed on the overall surface; subsequently, the gate metal layer and the gate oxide layer are patterned to form a gate electrode for the N-type TFT, a gate electrode for the P-type TFT and a power electrode as well as a gate electrode for the pixel TFT and the storage capacitor; afterwards, a first photo resist pattern which bares a predetermined region for the P-type TFT is formed on the surface over the substrate, and then p-type impurities are implanted to form source and drain electrodes for the P-type TFT; subsequently, after the first photo resist pattern is removed, an annealing treatment is carried out to activate the impurities; and finally, a passivation layer of photosensitive resin is formed and patterned to form contact holes; an ITO layer is then formed and patterned to form connections of the N-type TFT, the P-type TFT, the pixel TFT and the storage capacitor.

13 Claims, 5 Drawing Sheets

US 6,847,414 B2

MANUFACTURING METHOD FOR LIQUID CRYSTAL DISPLAY

FIELD OF THE INVENTION

The present invention relates to a fabricating technology of a liquid crystal display (LCD), more particularly, to a low temperature polysilicon LCD with a least number of photo masks to complete the manufacture of liquid crystal display pixels and drive circuits.

BACKGROUND OF THE INVENTION

A liquid crystal display (LCD) is a flat panel display with a property of low power consumption, and in comparison with a cathode ray tube (CRT) display of the same window dimension, the liquid crystal display is greatly decreased in either occupied space or weight and never has a curved panel as the conventional CRT display. Hence, the liquid crystal display has been widely applied in all sorts of manufactures, including consumptive electronic products such as pocket calculators, electronic dictionaries, watches, mobile phones, portable notebooks, communication terminal, display panels, desk-top personal computers, and even high dpi (dots per inch) televisions (HDTV) etc. The most popular display is a thin film transistor liquid crystal display (TFT-LCD) of active matrix type due to the fact that the viewing angle and contrast characteristics of the TFT-LCD are better than those of a super-twisted nematic liquid crystal display (STN-LCD) of passive matrix type, and that the TFT-LCD shows more rapid response (such as several tens of milliseconds) than the STN-LCD does (such as several hundred milliseconds).

Furthermore, for TFT-LCD is concerned, an amorphous silicon has mostly in a long term been a choice of material for a thin film transistor (TFT) to fabricate the TFT-LCD. However, now a polysilicon is used to be a substitute for the amorphous silicon for the TFT and may become a mainstream. This is because the polysilicon has a carrier (either electron or hole) mobility higher than that of the amorphous silicon. Additionally, the polysilicon TFT has an advantage of simultaneously forming the driving circuit (including nMOS transistors or pMOS transistors and even CMOS transistors) on the LCD panel during the fabrication of pixels. As a result of the above-mentioned, the polysilicon-type TFT-LCD can be switched at higher speed than the amorphous-type silicon TFT-LCD and is more attractive.

The polysilicon TFT-LCD is not perfect. For instance, when the TFT is at the off-state, often there is still a large drain leakage current. However, it can usually be overcome by the technique of a lightly doped drain (LDD) or a dual gate structure. The U.S. Pat. No. 5,940,151 invented by Yong-Min Ha etc. is one example.

The fabricating method of Ha's patent is briefly described as follows: Firstly, please refer to FIG. 1A, which is a plan view illustrating a pixel portion of a TFT-LCD. A signal line 40 and a scanning line 50 vertically intersect each other as shown in FIG. 1A, wherein the scanning line 50 is directly connected to a gate electrode 14 of the pixel TFT portion and the signal line 40 is connected to a source electrode 11S (as shown in FIG. 1B) at the pixel TFT. Storage capacitor electrodes 17 and 18 are connected to a drain electrode 11D of the pixel TFT. The upper electrode of the storage capacitor is connected to the outside of the pixel, that is, the contact region of the top capacitor electrode 18 is outside of the pixel. A pixel electrode 15 is also connected to the drain electrode 11D of the pixel TFT.

FIGS. 1B to 1E are cross-sectional views including a series of fabrication processes for a pixel (taken along line a—a' of FIG. 1A) and the drive circuit thereof. First of all, an N-type heavily doped silicon layer and a metal layer are sequentially formed on an insulating substrate 1000. Then, through a photolithography and an etching technique (a first photo mask), source and drain electrode regions 11S and 11D of the pixel TFT are defined wherein the drain region 11D includes a first storage capacitor electrode 17, and source and drain electrode regions 21S and 21D of the N-type TFT are also defined at the drive circuit. A silicon thin film is subsequently formed on the overall surface over the substrate. Thereafter, the silicon thin film is defined by a photolithography and an etching technique (a second photo mask) to form a predetermined region 10' for a channel 10 and a lightly doped drain (LDD) 12 of the pixel TFT and another predetermined region 20n' for a channel 20n and a lightly doped drain (LDD) 22 of a N-type TFT, wherein the defined silicon regions 10' and 20n' are superposed on the corresponding source/drain regions thereof to form electrical connections. Moreover, the silicon thin film is also defined to form the other predetermined region 20p' for a channel 20p and source/drain electrodes 23S, 23D of a P-type TFT.

Referring to FIG. 1C, an oxide layer and a gate metal layer are sequentially formed over the substrate. Then, a gate electrode 14, a storage capacitor dielectric layer 100 and a storage capacitor top electrode 18 of the pixel TFT are defined by a photolithography and etching technique (a third photo mask). Simultaneously, at the drive circuit portion, a gate electrode 24n of the N-type TFT and a gate electrode 24p of the P-type TFT are defined. Thereafter, N-type impurities are lightly doped into the substrate including the pixel TFT and the N-type TFT and the P-type TFT at the drive circuit.

Turning to the cross-sectional view shown in FIG. 1D, a photoresist pattern 63 is formed (a fourth photo mask) to cover the N-type TFT at the pixel and drive circuit portions and to bare the silicon thin film of the P-type TFT. Then, P-type conductive impurities are implanted to form source and drain electrodes 23S and 23D of the P-type TFT. Thereafter, the photoresist pattern 63 is removed. As shown in FIG. 1E, a passivation layer 300 is deposited on the overall surface over the substrate and then, contact holes are formed by a photolithography and an etching technique (a fifth photo mask) respectively at the pixel portion and the drive circuit portion. Thereafter, an ITO is deposited on the overall surface over the substrate including the passivation layer 300 and the contact holes. Finally, a pixel electrode 15 is defined by a photolithography and etching technique (a sixth photo mask) and connected to the storage capacitor and the pixel TFT, and simultaneously, a transparent conductive line 25 is formed for connecting the P-type TFT and the N-type TFT at the drive circuit.

SUMMARY OF THE INVENTION

The primary objective of the present invention is to provide a manufacturing method for a low temperature polysilicon LCD. In this invention method, merely five photo masks is needed to complete the manufacture of CMOS TFTs at a drive circuit portion and pixel TFTs at a pixel portion.

In one embodiment of this invention, a method for manufacturing a liquid crystal display including a pixel portion having a pixel TFT as well as a drive circuit portion having a N-type TFT and a P-type TFT is disclosed. In this method, firstly an un-doped silicon layer, an N-type silicon layer and a metal layer are sequentially formed over a substrate. Then, the metal layer and the N-type silicon layer are patterned to define source and drain electrodes for the N-type TFT at the drive circuit portion, source and drain electrodes for the pixel TFT and a bottom electrode of a storage capacitor at the pixel portion. Thereafter, a gate oxide layer and a gate metal layer are sequentially formed on the overall surface over the substrate. Subsequently, the gate metal layer and the gate oxide layer are patterned to form a gate electrode for the N-type TFT, a gate electrode for the P-type TFT and a power electrode at the drive circuit portion as well as a gate electrode for the pixel TFT and the storage capacitor at the pixel portion; wherein the distance between the gate electrode of the N-type TFT/the pixel TFT and the drain electrode thereof is different from that between the gate electrode thereof and the source electrode thereof so as to reduce a leakage current.

Afterwards, a first photo resist pattern which bares a predetermined region for the P-type TFT is formed on the surface over the substrate, and then p-type impurities are implanted to form source and drain electrodes for the P-type TFT. Subsequently, after the first photo resist pattern is removed, an annealing treatment is carried out to activate the impurities.

Finally, a passivation layer made of photosensitive resin is formed over the overall surface of the pixel portion and of the drive circuit portion, and the passivation layer is patterned to form contact holes. Then, an ITO layer is formed and patterned to form connections of the N-type TFT, the P-type TFT, the pixel TFT and the storage capacitor.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The detailed description of the present invention is given by the following best mode for illustration.

Figure 1A:
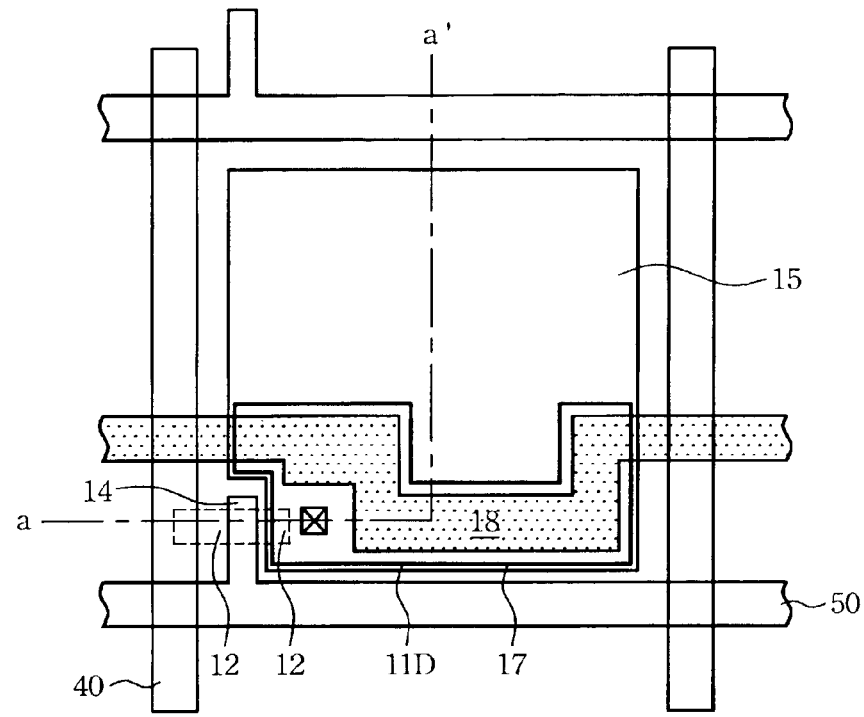
FIG. 1A is a plan view illustrating a pixel portion of a TFT-LCD in the prior art.
Figure 1B:
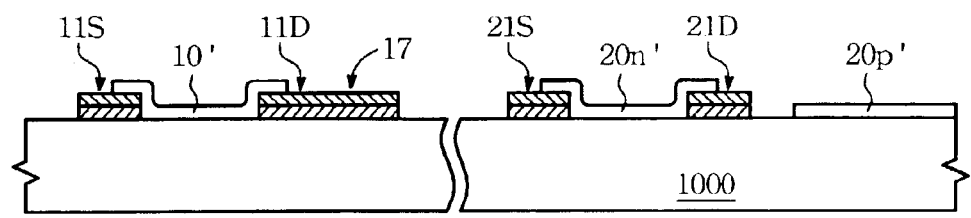
FIGS. 1B to 1E are cross-sectional views illustrating the process steps of fabricating a conventional LCD, wherein the pixel portion is taken along line a—a' of FIG. 1A.
Figure 1C:
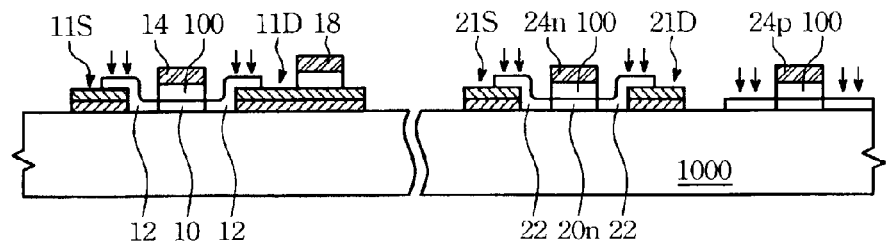
Figure 1D:
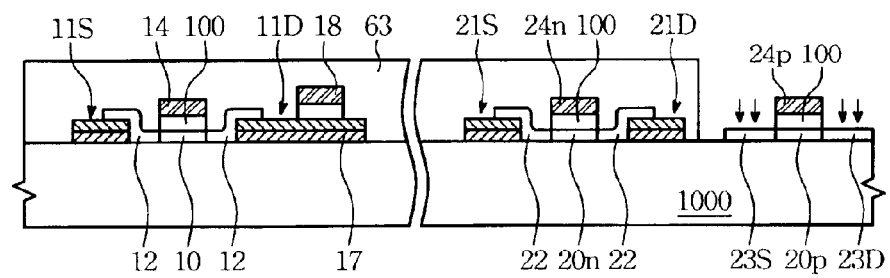
Figure 1E:
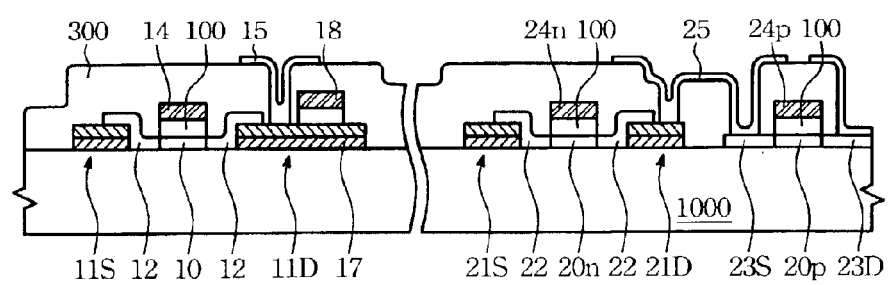
Figure 2A:
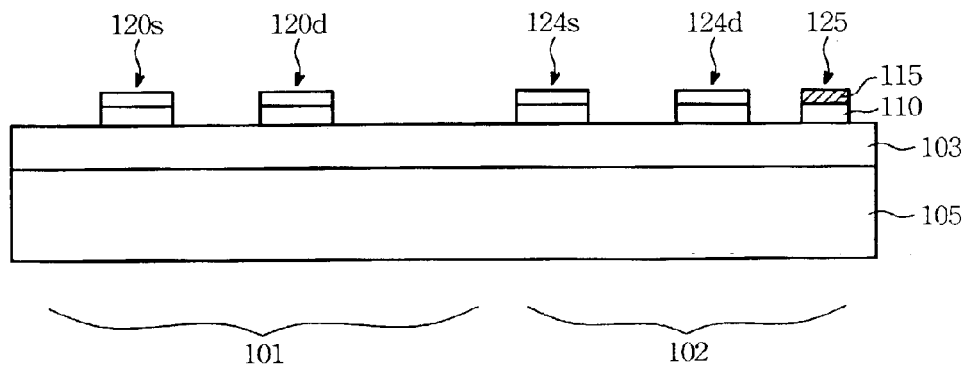
FIG. 2A is a schematic diagram of a dust-proof design for an electronic mouse in accordance with the present invention.

Please refer to FIG. 2A, which is a cross-sectional view of this invention. The formation steps are as follows: Firstly, an amorphous silicon layer 103 is formed on a transparent substrate 105. Subsequently, the amorphous silicon layer 103 is crystallized through a laser beam and then a polysilicon layer 110 doped with $n^+$ conductive impurities is deposited (hereinafter referred to as the "$n^+$ polysilicon layer 110") on the amorphous silicon layer 103. Thereafter, a metal layer 115 is deposited on the $n^+$ polysilicon layer 110. Alternatively, after the amorphous silicon layer 103 is deposited with a predetermined thickness, the $n^+$ impurities are doped into the surface of the amorphous silicon layer 103 to form an $n^+$ doped amorphous silicon layer 110. Subsequently, the amorphous silicon layer 103 as well as the $n^+$ doped amorphous silicon layer 110 are crystallized by a laser beam to respectively form an un-doped polysilicon layer 103 and an $n^+$ polysilicon layer 110, and a metal layer 115 is then deposited.

As shown in FIG. 2A, the metal layer 115 is subsequently patterned by a photolithography and an etching technique. The $n^+$ polysilicon layer 110 is etched using the metal layer 115 as a mask and the un-doped polysilicon layer 103 as a stop layer so that a source electrode 120s/a drain electrode 120d of an N-type TFT at a drive circuit region 101 as well as a source electrode 124s/a drain electrode 124d of a pixel TFT and a bottom electrode 115 of a storage capacitor 125 at a pixel region 102 are defined. At this time, a P-type TFT is not yet formed.

Figure 2B:
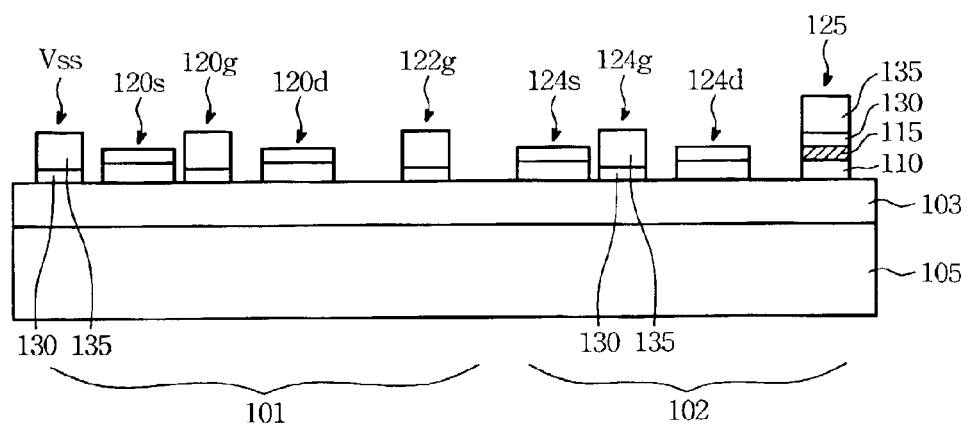
FIG. 2B is a schematic diagram of a dust-proof design for an electronic mouse in accordance with the present invention.

Referring to FIG. 2B, a gate oxide layer 130 and a gate metal layer 135 are sequentially deposited on the overall surface over the substrate. The gate metal layer 135 is patterned by a photolithography and etching technique and the gate oxide layer 130 is etched using the gate metal layer 135 as a mask so that a gate electrode 122g of the P-type TFT, a gate electrode 120g of the N-type TFT at the drive circuit region 101, a gate electrode 124g of the pixel TFT, a top electrode 135 of the storage capacitor 125 and a capacitor dielectric layer 130 at the pixel region 102, as well as a power electrode VDD (not shown) and a reference electrode VSS of the drive circuit are defined.

Figure 2C:
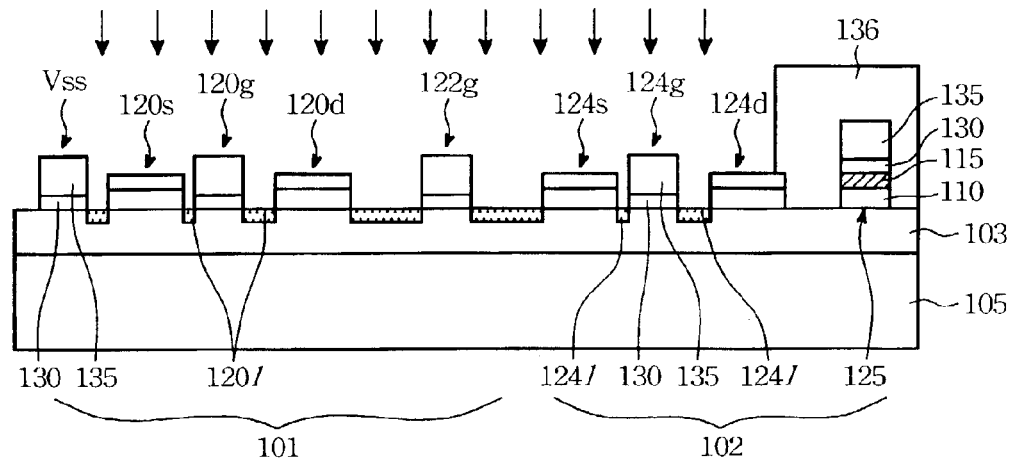
FIG. 2C is a schematic diagram of a dust-proof design for an electronic mouse in accordance with the present invention.

In order to reduce the possible leakage current when the TFT is at the off-state, the distance between the gate electrode 120g and the source electrode 120s is not identical to that between the gate electrode 120g and the drain electrode 120d. For instance, the distance between the gate electrode 120g and the drain electrode 120d is greater than that between the gate electrode 120g and the source electrode 120s so as to achieve the effect of leakage current reduction. Similarly, the distance between the gate electrode 124g of the pixel TFT and the drain electrode 124d is greater than that between the gate electrode 124g and the source electrode 124s, as shown in FIG. 2B. Another method to reduce the leakage current is that forming a photo resist 136 to cover the storage capacitor region and then conducting a LDD treatment on the overall surface. As shown in FIG. 2C, LDD regions 1201 and 1241 are formed in the polysilicon layer 103 and n-type impurities doped regions are also formed at the two sides of the gate electrode 122g. Since the asymmetrical distance is formed, the process step in FIG. 2C is optional.

Figure 2D:
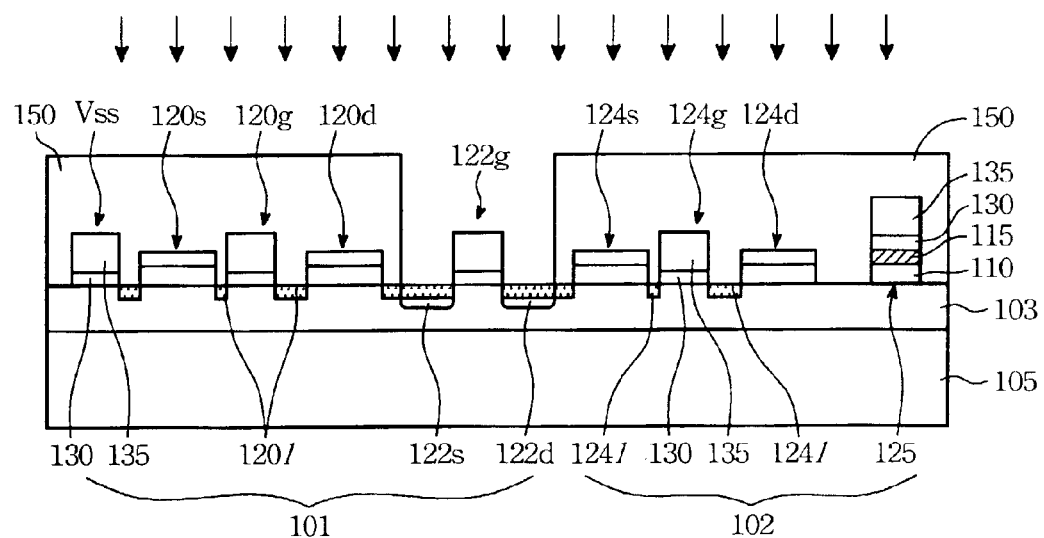
FIG. 2D is a schematic construction diagram of a dust-proof design for an electronic mouse in accordance with the present invention.

Turning to FIG. 2D, a first photo resist pattern 150 to define the P-type TFT at the drive circuit region 101 subsequently covers the overall surface. Then, p-type conductive impurities as impurity ions are implanted using the gate metal layer 135 of the gate electrode 122g of the P-type TFT and the first photo resist pattern 150 as masks. The implantation dosage must be higher than the dosage of the n-type impurities of the LDD such that predetermined regions for a source electrode 122s/a drain electrode 122d of the P-type TFT still have an enough concentration of the p-type conductive impurities after the electricity compensation.

Figure 2E:
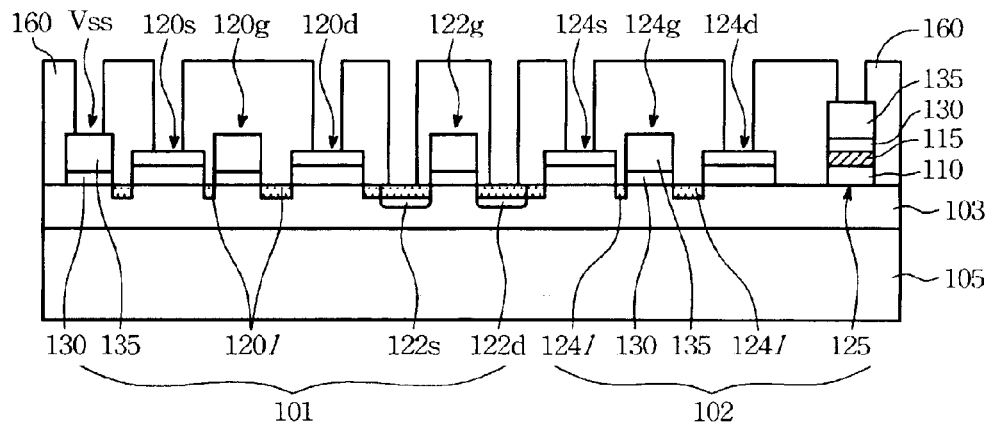
FIG. 2E is a schematic construction diagram of a dust-proof design for an electronic mouse in accordance with the present invention.

Referring to FIG. 2E, after the first photo resist pattern 150 is removed, a passivation layer 160 is formed on the overall surface and planarized. The formation of the passivation layer 160 may have many options: for example, (1) a silicon nitride layer is deposited on the overall surface to cover all the devices at the drive circuit region and at the pixel region and then the deposition is continued for planarization; or (2) a silicon nitride layer is firstly deposited and then a silicon oxide layer is deposited; or (3) a silicon nitride layer is firstly deposited with a portion of thickness and a photosensitive resin layer is subsequently deposited; or (4) a photosensitive resin is used as the only one material of the passivation layer. For the two latter formations having the photosensitive resin, since the photosensitive resin per se can be exposed to form the pattern of contact holes as shown in FIG. 2E, the formation of a photo resist pattern can be left out. However, the photosensitive resin after formation usually has to be exposed under a UV light so as to remove its inherent color to be transparent. As to the (1) and (2) formations, an additional photo resist pattern is needed and is later transferred to the silicon nitride layer by a photolithography and etching technique.

Furthermore, in order to activate the conductive impurity ions, an annealing step is carried out before or after forming the passivation layer 160. In a preferred embodiment, if the material for the passivation layer is silicon oxide or silicon nitride, the annealing treatment can be under an atmosphere containing hydrogen so as to eliminate the possible problems resulted from dangling bonds at the surface of the polysilicon. Nevertheless, if the passivation layer 160 comprises the photosensitive resin, the annealing treatment should be carried out before the formation of the photosensitive resin.

Figure 2F:
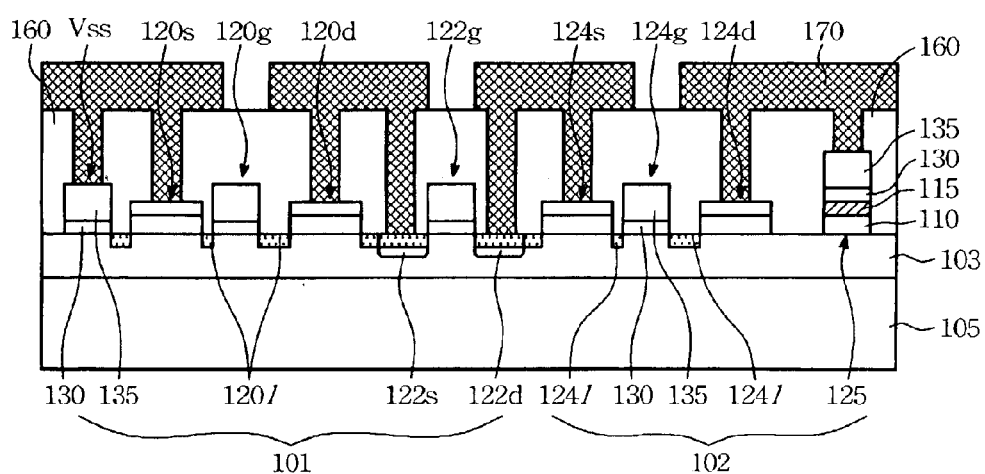
FIG. 2F is a partially cross sectional view of the electronic mouse placed on a carried surface in accordance with the present invention.

Finally, as shown in FIG. 2F, a transparent conductive oxide layer 170 is deposited on the overall surface. For instance, all of the contact holes are filled with ITO, and the conductive oxide layer is formed on the passivation layer 160. The conductive oxide layer is formed, by a photolithography and etching step, as transparent conductive lines at the drive circuit region 101, and at the pixel region 102, not only as connecting lines of the storage capacitor 125 and the pixel TFT, but also as a pixel electrode.

As is understood by a person skilled in the art, the foregoing preferred embodiment of the present invention is illustrated of the present invention rather than limiting of the present invention. It is intended to cover various modifications and similar arrangements included within the spirit and scope of the appended claims, the scope of which should be accorded the broadest interpretation so as to encompass all such modifications and variations.

What is claimed:

1. A method for manufacturing a liquid crystal display including a pixel portion having a pixel TFT as well as a drive circuit portion having a first conductivity type TFT and a second conductivity type TFT, said method comprising the steps of:

sequentially forming an un-doped silicon layer, a first conductivity type silicon layer and a metal layer over a substrate;

patterning said metal layer and said first conductivity type silicon layer to form source and drain electrodes for said first conductivity type TFT at said drive circuit portion, source and drain electrodes for said pixel TFT and a bottom electrode of a storage capacitor at said pixel portion;

sequentially forming a gate oxide layer and a gate metal layer on the overall surface over said substrate after being patterned;

patterning said gate metal layer and said gate oxide layer to form a gate electrode for said first conductivity type TFT, a gate electrode for said second conductivity type TFT and a power electrode at said drive circuit portion as well as a gate electrode for said pixel TFT and said storage capacitor at said pixel portion;

forming a first photo resist pattern on the surface over said substrate after being patterned, wherein said first photo resist pattern bares a predetermined region for said second conductivity type TFT;

implanting second conductivity type impurities using said first photo resist pattern and said gate electrode for said second conductivity type TFT as masks such that source and drain electrodes for said second conductivity type TFT contain only said second conductivity type impurities;

removing said first photo resist pattern;

forming a passivation layer over the overall surface of said pixel portion and of said drive circuit portion;

patterning said passivation layer to form contact holes to bare said power electrode, said source and drain electrodes for said first conductivity type TFT, said source and drain electrodes for said second conductivity type TFT, said source and drain electrodes for said pixel TFT as well as a top electrode of said storage capacitor;

forming a transparent conductive oxide layer over both said pixel portion and said drive circuit portion, wherein said contact holes are filled up and said passivation layer is covered; and patterning said transparent conductive oxide layer on said passivation layer to form connections of said first conductivity type TFT, said second conductivity type TFT, said pixel TFT and said storage capacitor.

2. The method of claim 1, wherein the step of forming said un-doped silicon layer and said first conductivity type silicon layer includes firstly depositing a silicon layer without said first conductivity type impurities and then depositing a silicon layer containing said first conductivity type impurities.

3. The method of claim 1, wherein the step of patterning said metal layer and said first conductivity type silicon layer includes firstly defining said metal layer by a photolithography and an etching technique and then etching said first conductivity type silicon layer with said patterned metal layer as a mask.

4. The method of claim 1, wherein the distance between said gate electrode of said first conductivity type TFT and said drain electrode thereof is greater than that between said gate electrode thereof and said source electrode thereof, and the distance between said gate electrode of said pixel TFT and said drain electrode thereof is greater than that between said gate electrode thereof and said source electrode thereof so as to reduce a leakage current.

5. The method of claim 1, after patterning said gate metal layer and before forming said first photo resist pattern, further including steps of firstly forming a lightly doped drain (LDD) mask layer to define a region for LDD implantation, doping n-type impurities, and then removing said LDD mask layer.

6. The method of claim 1, wherein the steps of forming and patterning said passivation layer includes firstly depositing a photosensitive resin layer and then exposing said photosensitive resin layer with a photo mask to form said contact holes.

7. The method of claim 6, before forming said photosensitive resin layer, further including a step of an annealing treatment to activate said first and second conductivity type impurities.

8. The method of claim 1, wherein the steps of forming and patterning said passivation layer includes the steps of:
firstly depositing a silicon nitride layer;
performing an annealing process to activate said first and second conductivity type impurities;
depositing said photosensitive resin layer on the overall surface;
patterning said photosensitive resin layer to form an upper portion of said contact holes; and
patterning said silicon nitride layer with said patterned photosensitive resin layer as a mask to complete the structure of said contact holes.

9. A method for manufacturing a liquid crystal display including a pixel portion having a pixel TFT as well as a drive circuit portion having a first conductivity type TFT and a second conductivity type TFT, said method comprising the steps of: sequentially forming an un-doped silicon layer, a first conductivity type silicon layer and a metal layer over a substrate;
patterning said metal layer and said first conductivity type silicon layer to form source and drain electrodes for said first conductivity type TFT at said drive circuit portion, source and drain electrodes for said pixel TFT and a bottom electrode of a storage capacitor at said pixel portion;
sequentially forming a gate oxide layer and a gate metal layer on the overall surface over said substrate after being patterned;
patterning said gate metal layer and said gate oxide layer to form a gate electrode for said first conductivity type TFT, a gate electrode for said second conductivity type TFT and a power electrode at said drive circuit portion as well as a gate electrode for said pixel TFT and said storage capacitor at said pixel portion, wherein the distance between said gate electrode of said first conductivity type TFT and said drain electrode thereof is different from that between said gate electrode thereof and said source electrode thereof, and the distance between said gate electrode of said pixel TFT and said drain electrode thereof is different from that between said gate electrode thereof and said source electrode thereof;
forming a first photo resist pattern on the surface over said substrate after being patterned, wherein said first photo resist pattern bares a predetermined region for said second conductivity type TFT;
implanting second conductivity type impurities with said first photo resist pattern and said gate electrode for said second conductivity type TFT as masks such that source and drain electrodes for said second conductivity type TFT contain only said second conductivity type impurities;
removing said first photo resist pattern;
performing an annealing process to activate said first and second conductivity type impurities;
forming a passivation layer of photosensitive resin over the overall surface of said pixel portion and of said drive circuit portion;
patterning said passivation layer to form contact holes to bare said power electrode, said source and drain electrodes for said first conductivity type TFT, said source and drain electrodes for said second conductivity type TFT, said source and drain electrodes for said pixel TFT as well as a top electrode of said storage capacitor;
forming a transparent conductive oxide layer over both said pixel portion and said drive circuit portion, wherein said contact holes are filled up and said passivation layer is covered; and
patterning said transparent conductive oxide layer on said passivation layer to form connections of said first conductivity type TFT, said second conductivity type TFT, said pixel TFT and said storage capacitor.

10. The method of claim 9, wherein the step of forming said un-doped silicon layer and said first conductivity type silicon layer includes firstly depositing a silicon layer without said first conductivity type impurities and then depositing a silicon layer containing said first conductivity type impurities.

11. The method of claim 9, wherein the step of patterning said metal layer and said first conductivity type silicon layer includes firstly defining said metal layer by a photolithography and etching technique and then etching said first conductivity type silicon layer with said patterned metal layer as a mask.

12. The method of claim 9, wherein the distance between said gate electrode and said drain electrode thereof is greater than that between said gate electrode and said source electrode so as to reduce a leakage current.

13. The method of claim 9, after patterning said gate metal layer and before forming said first photo resist pattern, further including steps of firstly forming a lightly doped drain (LDD) mask layer to define a region for LDD implantation, doping n-type impurities, and then removing said LDD mask layer.

* * * * *